US008495567B2

(12) United States Patent
Bak et al.

(10) Patent No.: US 8,495,567 B2
(45) Date of Patent: Jul. 23, 2013

(54) TRANSFERRING ANNOTATIONS ACROSS VERSIONS OF THE DATA

(75) Inventors: Nathan V. Bak, Portland, OR (US);
Patricia A. Gaughen, Portland, OR (US); Gerrit Huizenga, Portland, OR (US); Eric B. Munson, Hillsboro, OR (US); Ramachandra Pai, Beaverton, OR (US); Timothy C. Pepper, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 12/058,261

(22) Filed: Mar. 28, 2008

(65) Prior Publication Data
US 2009/0249291 A1  Oct. 1, 2009

(51) Int. Cl.
*G06F 9/44* (2006.01)
(52) U.S. Cl.
USPC ............ 717/120; 717/121; 717/122; 717/123
(58) Field of Classification Search
USPC .................................................. 717/120–123
See application file for complete search history.

(56) References Cited

U.S. PATENT DOCUMENTS

| 6,591,272 | B1 | 7/2003 | Williams |
| 6,980,993 | B2 | 12/2005 | Horvitz et al. |
| 6,996,584 | B2 | 2/2006 | White et al. |
| 7,206,788 | B2 | 4/2007 | Horvitz et al. |
| 7,966,602 | B1 * | 6/2011 | Webster et al. ............... 717/114 |
| 2005/0261787 | A1 * | 11/2005 | Plante ............................. 700/30 |
| 2006/0212464 | A1 * | 9/2006 | Pedersen ....................... 707/101 |
| 2006/0230063 | A1 | 10/2006 | Pollinger |
| 2008/0046858 | A1 * | 2/2008 | McClean et al. .............. 717/100 |

OTHER PUBLICATIONS

Miryung Kim, An Empirical Study of Code Clone Genealogies, Sep. 2005, ACM 1-59593-014-0/05/0009, p. 187-196.*
Hodges, "javaJAM Supporting Collaborative Review and Improvement of Open Source Software", Aug. 2000,p. 1-84.*
Nejdl et al., Innovative Approaches for Learning and Knowledge Sharing, European Conference on Technology Enhanced Learning, 1st Crete, Oct. 1-4, 2006, EC-TEL 2006 Proceedings (Lecture Notes in Computer Science, vol. 4227).
Swierk et al., The Roma Personal Metadata Service, Mobile Networks and Applications, 7, pp. 407-418, 2002.
Ives et al., An XML Query Engine for Network-Bound Data, VLDB Journal 11:380-402, Dec. 2002.

* cited by examiner

*Primary Examiner* — Li B Zhen
*Assistant Examiner* — Duy Khuong Nguyen
(74) *Attorney, Agent, or Firm* — Lieberman & Brandsdorfer, LLC

(57) ABSTRACT

A method, apparatus, and article are provided for managing migration of annotations between versions of source code. Annotations associated with patterns of source code are identified. A comparison of the modified source code is conducted in conjunction with the identified annotations in a prior version of the source code to determine if the annotations may be migrated to any portions of the modified source code. The comparison includes an exact match and a partial match. With respect to the partial match, a threshold value is employed to define the parameters of a partial match. All annotations that are determine to be an exact match or a partial match are automatically migrated to a location in the modified source code determine to match within the threshold value.

15 Claims, 5 Drawing Sheets

```
81:   es = EXT4_SB (sb) ->s_es;
82:   if (ino< EXT4_First_INO(sb) || ino > le32_to_cpu (es ->s_inodes_count)) {
83:          ext4_error (sb, "ext4_free_inode",
84:                      "reserved or nonexistent  inode %lu", ino);
85:          goto error_return;
86:   }
87:   block_group = ( ino - 1) / EXT4_INODES_PER_GROUP(sb);
88:   bit = (ino - 1) % EXT4_INODES_PER_GROUP(sb);
89:   bitmap_bh = read_inode_bitmap(sb, block_group);
90:   if (!bitmap_bh)
91:          goto error_return;
```

FIG. 4A

```
description:  checks if there is a bitmap buffer head for the  inode group.
line number:  81, 91
file:  ialloc.c
max-threshold:  100%
min-threshold:  50%
match-type:  string match
```

402 — max-threshold
404 — min-threshold

FIG. 4B

```
41:   es = EXT4_SB(sb) ->s_es;
42:   block_group = ( ino - 1) / EXT4_INODES_PER_GROUP(sb);
43:   bit = (ino - 1) % EXT4_INODES_PER_GROUP(sb);
44:   bitmap_bh = read_inode_bitmap(sb, block_group);
45:   if (!bitmap_bh)
46:          goto error_return;
```

FIG. 4C

TRANSFERRING ANNOTATIONS ACROSS VERSIONS OF THE DATA

BACKGROUND OF THE INVENTION

1. Technical Field

This invention relates to automatically merging modified source code with annotations from a prior version of the source code. More specifically, the invention pertains to defining the parameters of a match between the annotations and the modified source code, and based upon the defined parameters selectively allowing an automated merge of the annotations with the source code.

2. Description of the Prior Art

Source code is a sequence of program instructions in their original form. Source code is primarily used as input to a process that produces an executable program. It is known in the art that a programmer often adds annotations to source code. In one embodiment, an annotation is a comment attached to a particular section of a document. Annotations doe not affect the functionality of the source code. Rather, the annotations provide supplementary information pertaining to the source code, such as explanations for other programmers, reminders, plans for improvement, etc. In one embodiment, annotations can be added to the source code by a compiler or programmer in the form of metadata. For example, a compiler may use an annotation to make decisions about warnings to issue, or a linker can use an annotation to connect multiple objects into a single executable. A linker is a program that takes one or more objects generated by compilers and assembles them into a single executable program.

Often, software developers need to be able to create and access information that is not going to be part of the source file itself. The benefit of employment of annotations is that they are usually part of several software development activities, where third party source code is analyzed in a functional way. Annotations can therefore help the developer during any stage of software development where a formal documentation system would hinder progress.

It is known in the art that source code is not static and is periodically subject to change. Furthermore, it is known in the art that a prior form of the metadata and the modified source code may not be aligned when changes to the source code occurs. This misalignment is a waste of the annotations in the source code. Although annotations can be moved and/or copied to identify different locations of the source code to which it pertains, a manually alignment of annotated source code with annotations is inefficient. There are situations when source code is updated or enhanced often. A manual alignment would be time consuming for a frequently modified source code. Accordingly, there is a need for an automated alignment of annotations with modified source code.

SUMMARY OF THE INVENTION

This invention comprises a method, system, and article for automating alignment of annotations with modified source code.

In one aspect of the invention, a method is provided for transferring annotations across versions of data. A set of data is described with annotations, and the annotations are associated with source code. At some point, the source code is modified, while the annotation remains static. The annotation is compared with the modified source code through use of a migration algorithm. A threshold setting is employed with the migration algorithm together with the comparison process. The threshold setting defines the parameters of what constitutes a match of the annotation and the modified source code. An automatic migration of the annotation to a location within the modified source code is enabled for portions of the source code that match the annotation within the threshold setting of the migration algorithm.

In another aspect of the invention, a computer system is provide with a processor in communication with storage media. Annotations that describe a set of data are stored on the storage media. The annotation is associated with source code. A source code modification tool is provided to support amendments to the source code. A comparison tool is provided to employ a migration algorithm to compare the annotation within the modified source code. Within the migration algorithm, a threshold value is present. The threshold value defines the parameters of a match between the annotation and the modified source code. A migration tool automatically migrates the annotation to a location in the modified source code determined by the comparison manager to match within the threshold value.

In yet another aspect of the invention, a computer program product is provided with a computer useable medium having a computer readable program. When the program is executed on a computer, the program causes the computer to associate annotation that describes a set of data, with source code. The program supports modification of the source code. When the source code is modification, the program supports a migration algorithm comparing the annotation with the modified source code. A threshold setting that defines the parameters of a match of the annotation and the modified source code is employed with the migration algorithm. The program supports the automatic migration of the annotation to a location in the modified source code determined to match within the threshold setting.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 4A-4C illustrates an example of a partial match.

DESCRIPTION OF THE PREFERRED EMBODIMENT

Overview

It is known in the art to annotate source code with one or more annotations to provide documentation associated with the source code. As is also known in the art, source code may be modified from time to time for various reasons, including removal of errors therein and upgrading the code to improve functionality thereof. When the source code is modified, the annotation that was associated with the original source code does not automatically transfer or convey to the modified source code. Source code generally includes patterns based upon algorithms and routines therein. Modification to the source code may include movement of such algorithms to different locations in the source code, repetition of the algorithm with additional source code, or removal of one or more algorithms from the source code. A comparison tool is provided to analyze modified source code and to automatically annotate the modified source code with one or more previously created annotations without requiring manual input of annotations to the modified source code. Different threshold techniques are employed within the comparison tool in order to determine when an automated annotation of the modified source code is appropriate.

Technical Details

When a programmer writes a program, source code is created. Optionally, the programmer, or someone familiar with the program, may add annotations to the source code. In one embodiment, the annotations augment the source code based upon patterns present in the source code. The annotations may be applied to routines that are present in the source code. At such time as the source code is modified, it is beneficial to migrate the relevant annotations from the original source code to the modified source code in order to maintain the association of the relevant annotations to the related source code within the program. The first part of the migration process requires a determination of the quantity of annotations present in the source code. For purposes of description, a single annotation may refer to several lines of source code to explain or otherwise augment the source code.

Figure 1:
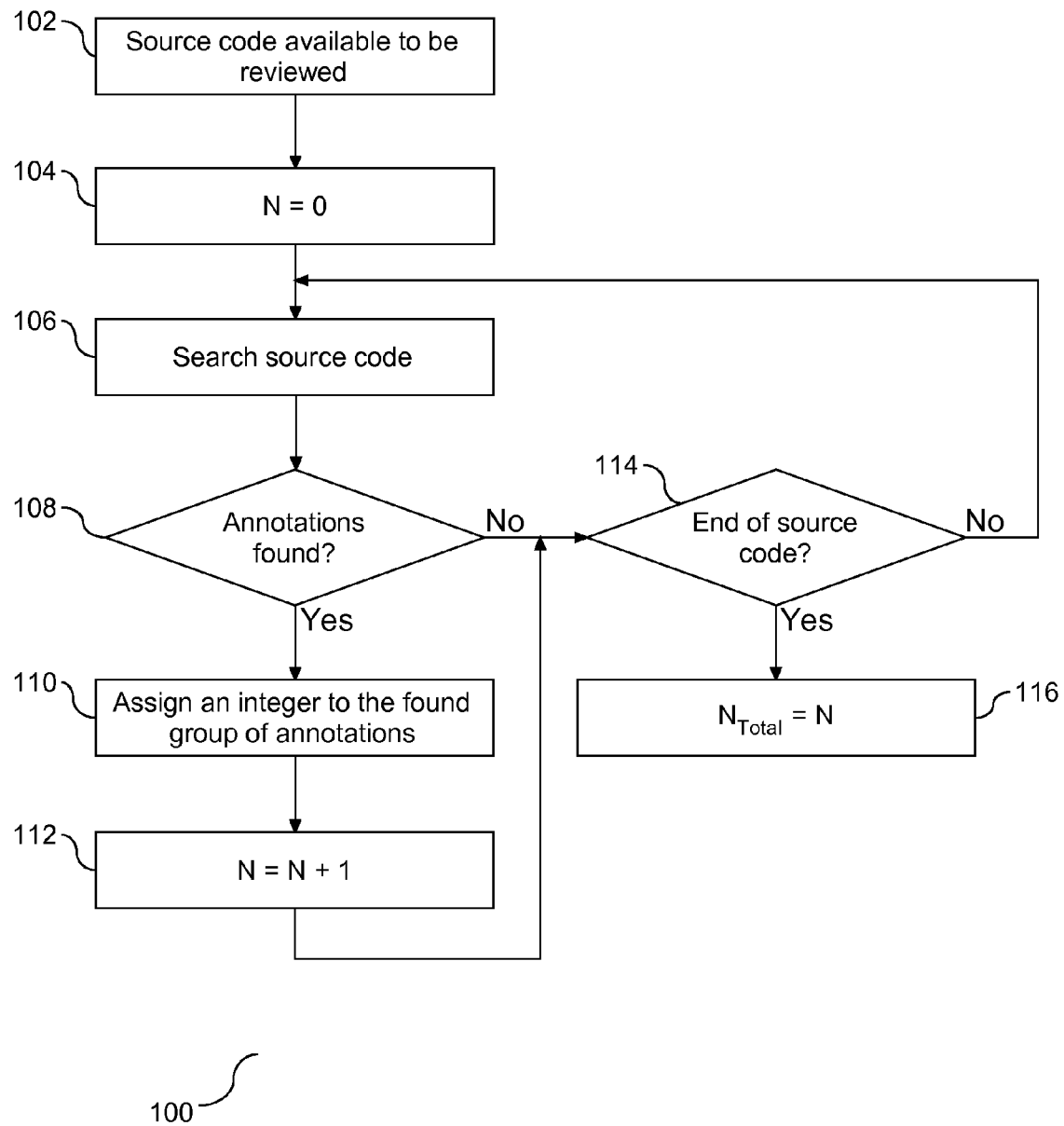
FIG. 1 is a flow chart demonstrating a process for determining patterns with annotations present in source code.

FIG. 1 is a flow chart (100) demonstrating a process for determining patterns with annotations present in source code. The source code is made available to be reviewed (102). In one embodiment, a group of annotations may be applied to a select set of line numbers in the source code. A counting variable, N, is calibrated (104), followed by a search of the source code to determine if there are any annotations present, and if so to assign an integer to each group of annotations that are assigned to a select set of lines or an algorithm present in the source code, as described in detail below. As the source code is in the process of being reviewed, it is determined whether any groups of annotations have been found (108). A positive response to the determination at step (108) is followed by assignment of an integer to the group of annotations found (110), followed by an increment of the counting variable N (112). Following either a negative response to the determination at step (108) or following step (112), it is determined if the search of the source code has reached the end of the source code (114). A positive response to the determination at step (114) concludes the review of the source code for groups of annotations. After the source code has been searched in it's entirety for annotations and integers have been assigned to the groups of annotations present, an integer, $N_{total}$, is assigned to the total quantity of annotations found in the source code (116). Alternatively, if it is determined at step (114) that the search of the source code has not reached the end of the source code, the process returns to step (106) to continue the process of searching for groups of annotations. Accordingly, the first part of the annotation migration process is to determine the quantity of annotations present in the source code prior to migration, assign an integer to each annotation present, and track the total number of annotations present in the program.

Figure 2:
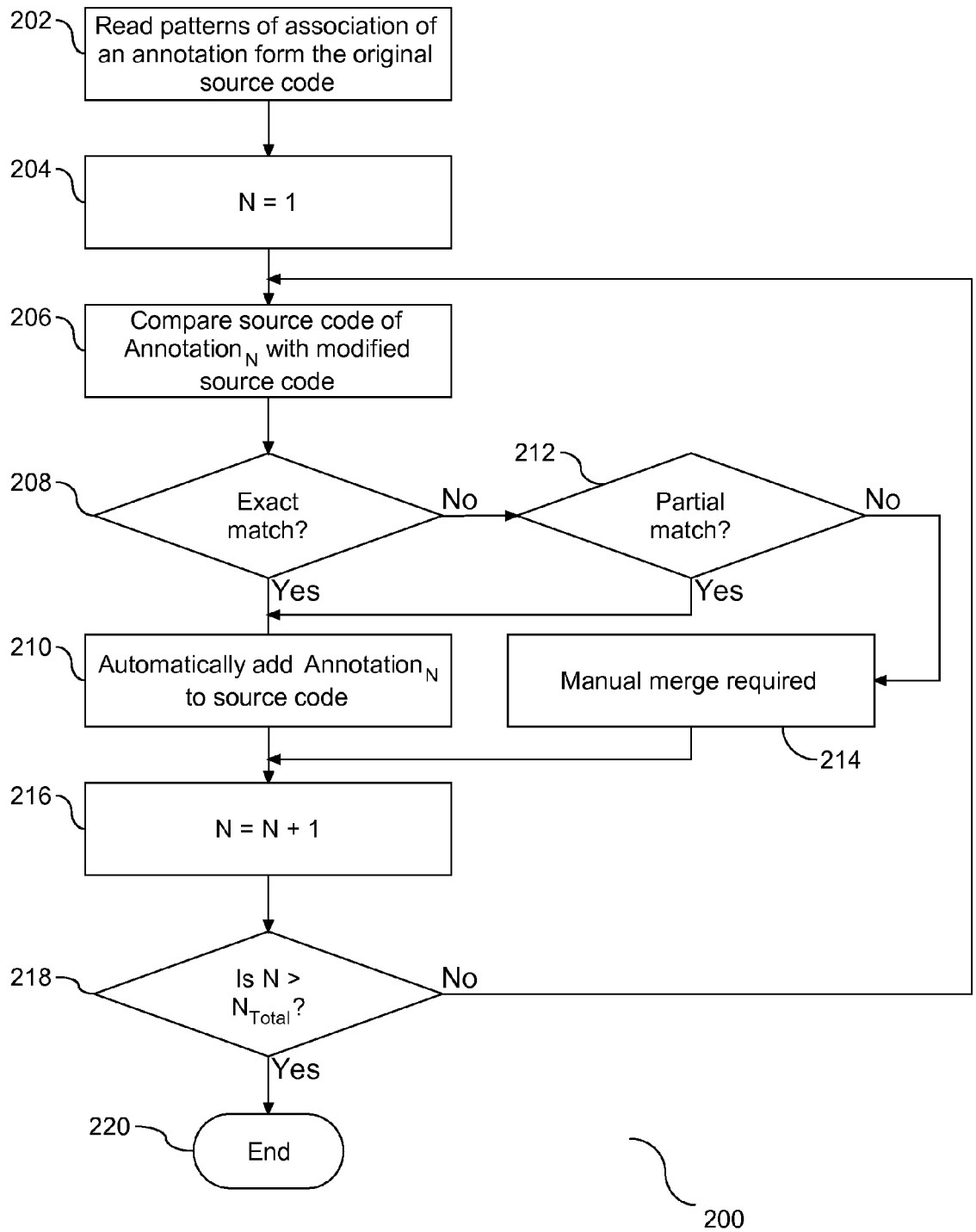
FIG. 2 is a flow chart illustrating a process for comparing patterns of annotations with source code according to the preferred embodiment of this invention, and is suggested for printing on the first page of the issued patent.

FIG. 2 is a flow chart (200) illustrating a process for comparing source code annotation patterns with modified source code to determine if the modified source code matches with the prior version of source code containing associated annotations. It is known in the art that source code is periodically modified, updated, and/or changed. Furthermore, it is known in the art that source code annotations are provided with select portions of source code. When the source code is subject to a modification, the modified portion of the source code may not retain the original annotations associated therewith. Initially, the patterns of association of an annotation with related source code from the original source code are read (202), and a counting variable, N, is set to one (204). Each portion of source code with an associated annotation found in the original source code is analyzed against the modified source code. More specifically, portion of source code associated with $Annotation_N$ is compared to the modified source code (206). It is determined if there is an exact match of the portion of source code associated with $Annotation_N$ to one or more portions of the modified source code (208). A positive response to the determination at step (208) is followed by an automated addition of $Annotation_N$ to each portion of the source code determined to match (210). However, if at step (208) it is determined that an exact match of the portion of source code associated with $Annotation_N$ does not exist in the modified source code, it is determined if there is a partial match of the portion of source code associated with $Annotation_N$ in the modified source code (212). Details of what constitutes a partial match are discussed below in reference to FIG. 3. A positive response to the determination at step (212) is followed by an automated addition of $Annotation_N$ to each portion of the source code determined to match with the portion of source code associated with $Annotation_N$ within the definition of a partial match (210). However, if at step (212) it is determined that a partial match of the portion of source code associated with $Annotation_N$ does not exist within the modified source code, a message is communicated that the $Annotation_N$ may require a manual merge into the modified source code (214) in order to become a part of the modified version of the source code. Following step (210), the variable N is incremented (216). Thereafter, it is determined if the variable N is greater than $N_{total}$ (218) as defined at step (116) in FIG. 1. A positive response to the determination at step (218) indicates that all annotations detected in the review of the prior version of the source code have been analyzed for integration into the modified source code and concludes the review of the modified source code (220). Conversely, a negative response to the determination at step (218) is followed by a return to step (206) for a review and comparison of the next portion of source code associated with an annotation with the modified source code. Accordingly, the process outlined above demonstrates how each group of source code annotations are compared with the modified source code to facilitate an automated merge of the annotations from a prior version of source code to the modified version of source code.

As illustrated in FIGS. 1 and 2, each annotation pattern from the original source code is compared to the modified source code to determine if the annotation continues to address the instructions set forth in the modified source code. In FIG. 2, it is shown that each annotation may be a complete match, a partial match, or a non-match. A complete match occurs when the source code associated with the annotation pattern has not changed. In such circumstances, the annotation associated with the compared portion of source code may be automatically applied to the select portion of the modified source code. However, circumstances become more complicated when addressing a partial match, including defining the terms of a partial match. As noted above, a complete match and a non-match return with specific instructions, either an automated migration of the annotation pattern to a specified portion of the modified source code or a return message requiring a manual migration, if any. With respect to the partial match, a threshold is used to quantify what constitutes a partial match. Essentially, a threshold is the numerical value that divides what is defined as a partial match and a non-match.

Figure 3:
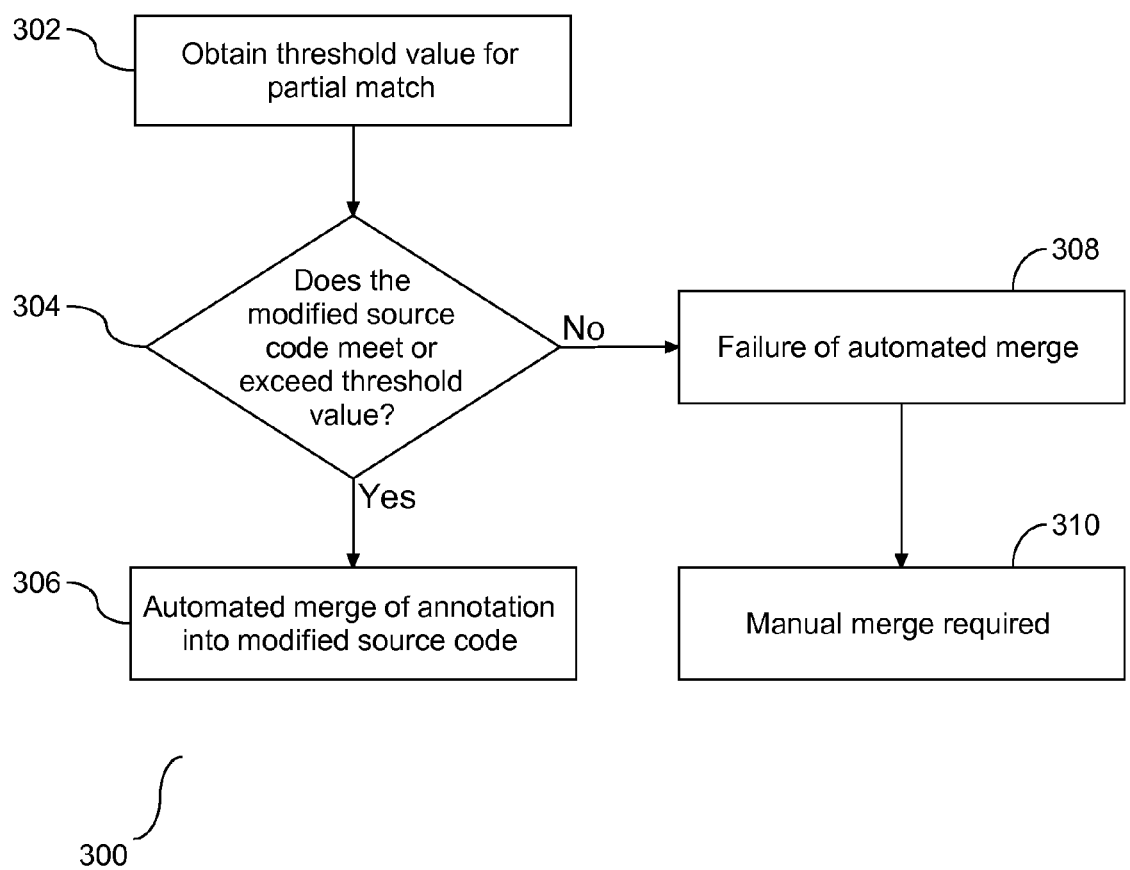
FIG. 3 is a flow chart demonstrating employment of a threshold value into the determination of a match of an annotation with source code.

FIG. 3 is a flow chart (300) demonstrating employment of a threshold value into the determination of a match of an annotation with source code. As shown at step (212), a determination is conducted as to whether there is a partial match of the subject annotation pattern to the modified source code. In order to determine a partial match, a threshold value is obtained (302) to define the minimum requirement of similarities between the portions of source code associated with an annotation to the modified source code to qualify for an automated merge of the annotation into the modified source code. In one embodiment, the threshold value is a static value in the comparison module. However, in one embodiment, the threshold value is a non-static value that is dynamically injected into the migration algorithm during comparison of the source code pattern associated with the annotation with the modified source code. Regardless of whether the threshold value is static or dynamic, it is determined whether the modified source code meets or exceeds the threshold value for a match with the specified source code pattern (304). A positive response to the determination at step (304) will result in an automated merge of the associated annotation into the modified source code (306). Similarly, a negative response to the determination at step (304) will result in a failure of the automated merge (308) requiring a manual review and merge, if possible (310). Accordingly, when conducting a partial match, the threshold value defines the parameters of what is or is not a match between the modified source code and the source code pattern associated with an annotation from a prior version of source code.

In one embodiment, an exact match of an annotation may apply to one or more sections of modified source code. However, there are circumstances that are envisioned wherein the modified source code and the portion of source code associated with the annotation in the prior version of source code do not exactly match. An example of a partial match is explained in more detail below with respect to FIGS. 4A-4C. FIG. 4A is an example of source code with an associated annotation pattern shown in FIG. 4B. As shown in the annotation pattern, the maximum threshold for a match of the annotation pattern with source code is set at one hundred percent (402), and the minimum threshold for a match of the annotation pattern with the source code is set at fifty percent (404). In one embodiment, the threshold settings may be placed external to the annotation. For example, the threshold settings may be placed in one or more instructions associated with the merge process. In order for this annotation pattern to match with modified source code, there is a minimum requirement of at least one half of the source code remaining unchanged. FIG. 4C is an example of modified source code from the sample source code shown in FIG. 4A. As shown in FIG. 4C, four of the lines of code have been removed. The remaining six lines of code have not been changed and remain in the source code. Since the threshold is set at fifty percent, a comparison of the annotation pattern to the modified source code will find a partial match in excess of fifty percent, i.e. six of ten lines match. This will result in a migration of the annotation pattern to this location in the modified source code.

As shown in the example, the minimum and maximum threshold settings for a match are provided in the annotation pattern itself. In one embodiment, the threshold setting may be provided by a user who wants to migrate one or more annotation patterns to modified source code. There are different embodiments that enable the user to augment or override the settings provided in the threshold values in the annotation. In one embodiment, the user can reduce the minimum threshold setting, thereby overriding the previously establish setting. For example, those patterns that fall below a set threshold of fifty percent can still be classified as a partial match by using a supplemental user injected threshold setting. Similarly, in one embodiment, the user can migrate the annotation pattern to only those portions of the applicable modified source code that match the criteria defined in the annotation and also match a specified portion of the source code. More specifically, the user can specify in addition to the threshold value specific lines of code in the modified source code that must match in their entirety. Accordingly, the threshold value for ascertaining what constitutes a match between the annotation pattern and the modified source code can be dynamically modified during the comparison process.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For purposes of this description, a computer-usable or computer readable medium can be any apparatus that can contain, or store, the program for use by or in connection with the instruction execution system, apparatus, or device.

Figure 5:
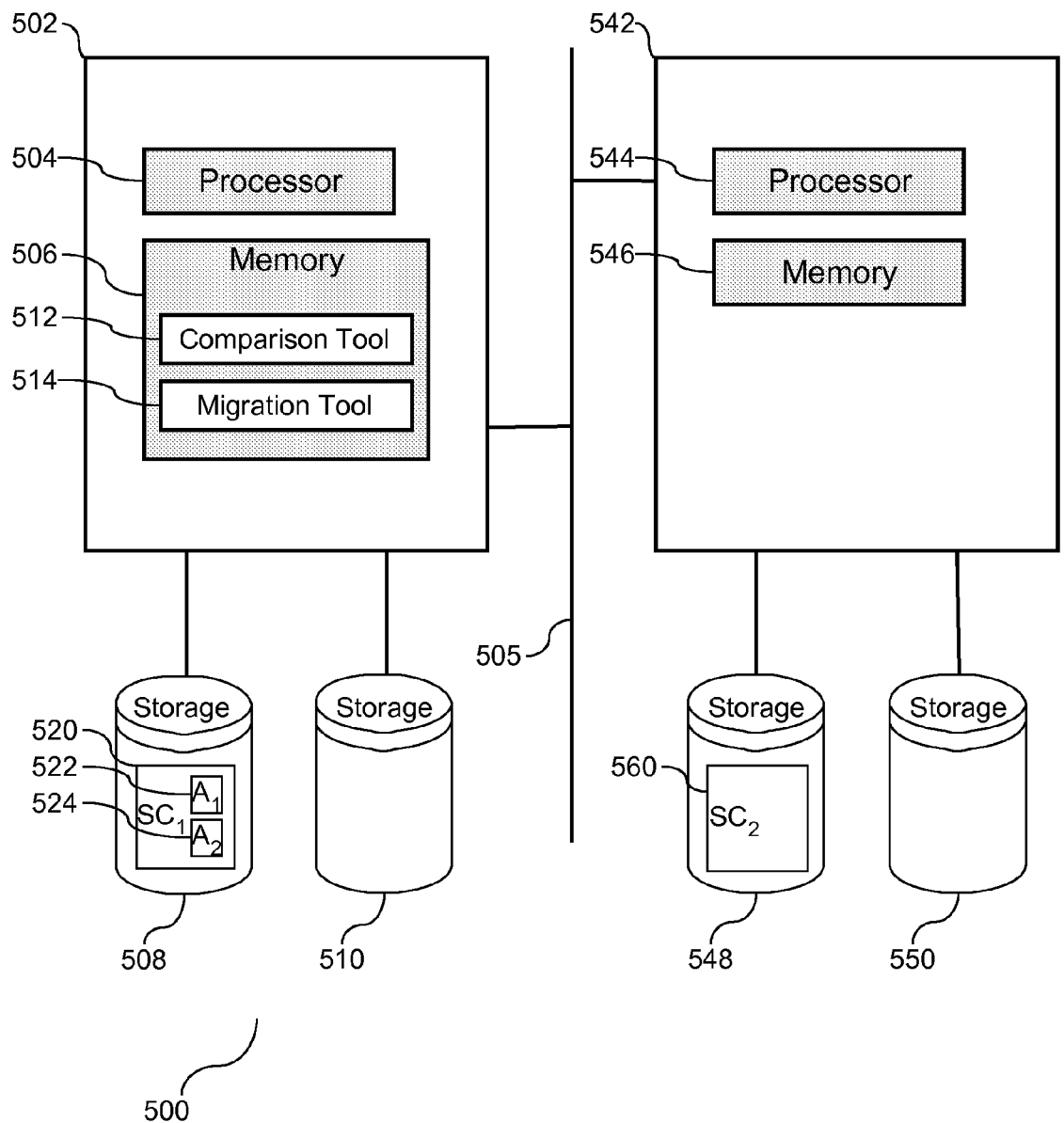
FIG. 5 is a block diagram illustrating an annotation transfer tool in a computer system.

Similarly, in one embodiment the invention is implemented in hardware. FIG. 5 is a block diagram (500) illustrating an annotation transfer tool in a computer system. The illustration shows a first computer system (502) with a processor (504), memory (506), and storage media (508) and (510) in communication across a network (505) with a second computer system (542) having a processor (544), memory (546), and storage media (548) and (550). A first version of source code (520) is shown in storage media (508) with two groups of annotations (522) and (524) associated with the source code (520). Similarly, a second version of the source code (560) is shown in storage media (548) prior to an automated migration of the annotations (522) and (524) from the first version of the source code (520) to the second version of the source code (560). In one embodiment, the computer system (502) may be limited to a single storage media with both versions of the source code stored thereon. Similarly, in one embodiment, the computer system may include additional storage media, and a different quantity of annotations. Accordingly, the invention should not be limited to the quantity of storage media, source code version, and annotations shown herein.

The memory (506) of the first computer system (502) is provided with tools to facilitate automated migration of one or more annotations from one version of source code to a modified version of source code. As shown, the memory is provided with a comparison tool (512) and a migration tool (514). The comparison tool (512) functions to compare the source code associated with the annotations (522) and (524) with the second version of the source code (560). The comparison tool (512) is in communication with the migration tool (514). Dependent upon the results of the comparison tool (512), the migration tool automatically migrates one or more of the annotations (522) and (524) to a location in the second version of the source code (560) that was determined by the comparison tool (512) to match within a threshold value. Although the system shown herein is a single computer with a processor (504), memory (506) and storage media (508) and (510), in one embodiment, the invention may be enlarged to encompass additional client machines and/or servers in the system with access to the comparison and migration tools (512) and (514), respectively. Similarly, the system (500) shown herein, illustrates the comparison tool (512) and the migration tool (514) in the first computer system (502). In one embodiment, the second computer system (542) may also be configured with a comparison tool (not shown) and a migration tool (not shown). This embodiment would provide the second computer system (542) with access to the original source code and annotations on the first computer system (502), along with access to the new source code on the second computer system (542).

In the example shown herein, the comparison tool and migration tool (512) and (514), respectively, are shown residing in memory (506), and utilize instructions in a computer readable medium to migrate annotations between different versions of source code. In one embodiment, the comparison and migration tools (512) and (514), respectively, may reside as hardware tools external to memory (506), or they may be implemented as a combination of hardware and software in the computer system. Accordingly, the comparison and migration tools (512) and (514), respectively, may be implemented as a software tool or a hardware tool to facilitate migration of annotations across different versions of source code in a computer system.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include but are not limited to a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code includes at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

A tool is provided to enable automated migration of annotations of source code across different versions of the source code. The migration is not limited to exact matches of the source code patterns. Rather, a partial match within a defined threshold may be set, to enable the migration for a non-exact match. The threshold value may be set in the annotation, in code associated with the migration tool, or injected by a user during the migration process. Patterns within modified source code are searched to facilitate the migration process. In one embodiment, the patterns may include specific subroutines, locks, etc. By searching for patterns within modified source code, together with the flexibility of injecting a threshold value to define a partial match, ease of an automated migration is enhanced by mitigating the potential quantity of match failures that would require manual intervention.

Alternative Embodiments

It will be appreciated that, although specific embodiments of the invention have been described herein for purposes of illustration, various modifications may be made without departing from the spirit and scope of the invention. In particular, the invention should not be limited to search for lines of code that have been modified within a group of lines of code. Rather, the comparison tool may search to insert an annotation for instructions in the source code that execute under specific conditions. For example, the pattern being search may include any code executed under two or more locks, and specify the order of the locks, or not specify the order of the locks. Another example may include code which is handled under the auspices of an interrupt handler. Accordingly, the scope of protection of this invention is limited only by the following claims and their equivalents.

We claim:

1. A method for transferring annotations across versions of data comprising:
    describing a set of data with an annotation and associating said annotation with source code, wherein said annotation is supplementary information attached to specific lines within said source code;
    modifying said source code;
    comparing said source code with said modified source code through a migration algorithm;
    employing a threshold setting with said migration algorithm to said comparison of said source code with said modified source code, wherein said threshold setting defines a degree of similarity of said source code and said modified source code;
    dynamically injecting said threshold setting into said migration algorithm during comparison of said annotation with said modified source code; and
    automatically migrating said annotation to a specified portion of said modified source code determined to match within said threshold setting, and absent modifying said annotation.

2. The method of claim 1, wherein said threshold setting of said migration algorithm includes a maximum threshold and a minimum threshold of differences between said source code and said modified source code.

3. The method of claim 2, further comprising returning a message of a partial match of said annotation to a location in said source code when said annotation is within limits of said minimum threshold and said maximum threshold.

4. The method of claim 3, further comprising automatically merging said annotation with said location in said modified source code responsive to said partial match.

5. The method of claim 2, further comprising requiring a manual merge of said annotation to said location in said modified source code when said annotation is less than said minimum threshold.

6. A computer system comprising:
a processor in communication with data storage media;
an annotation stored on said storage media to describe a set of data, wherein said annotation is associated with source code, wherein said annotation is supplementary information attached to said source code;
said source code subject to modification;
a comparison tool to employ a migration algorithm to compare said source code with said modified source code;
a threshold value present in said migration algorithm and employed with said comparison, said threshold value defines a degree of similarity of said source code with said modified source code;
an injection tool to dynamically inject said threshold value into said migration algorithm during comparison of said annotation with said modified source code; and
a migration tool to automatically migrate said annotation to a specified portion of said modified source code determine by said comparison manager to match within said threshold value, and absent modifying said annotation.

7. The system of claim 6, wherein said threshold setting of said migration algorithm includes a maximum threshold and a minimum threshold of differences between said source code and said modified source code.

8. The system of claim 7, further comprising a return message of a partial match of said annotation to a location in said source code when said annotation is within limits of said minimum threshold and said maximum threshold.

9. The system of claim 8, further comprising an automatic merge of said annotation with said location in said modified source code responsive to said partial match.

10. The system of claim 7, further comprising a manual merge of said annotation to said location in said modified source code when said annotation is less than said minimum threshold.

11. A computer program product comprising a computer memory including a computer readable program, wherein the computer readable program when executed on a computer causes the computer to:
describe a set of data with an annotation and associate said annotation with source code, wherein said annotation is supplementary information attached to said source code;
modify said source code;
compare said source code with said modified source code through a migration algorithm;
employ a threshold setting with said migration algorithm to said comparison of said source code with said modified source code, wherein said threshold setting defines a degree of similarity of said source code and said modified source code;
dynamically inject said threshold setting into said migration algorithm during comparison of said annotation with said modified source code; and
automatically migrate said annotation to a specified portion of said modified source code determined to match within said threshold setting, and absent modifying said annotation.

12. The computer program product according to claim 11, wherein said threshold setting of said migration algorithm includes a maximum threshold and a minimum threshold of differences between said source code and said modified source code.

13. The computer program product according to claim 12, further comprising instructions to return a message of a partial match of said annotation to a location in said source code when said annotation is within limits of said minimum threshold and said maximum threshold.

14. The computer program product according to claim 13, further comprising instructions to automatically merge said annotation with said location in said modified source code responsive to said partial match.

15. The computer program product according to claim 12, further comprising instructions to require a manual merge of said annotation to said location in said modified source code when said annotation is less than said minimum threshold.

* * * * *